US007805726B1

(12) United States Patent
Leonard et al.

(10) Patent No.: US 7,805,726 B1
(45) Date of Patent: Sep. 28, 2010

(54) MULTI-LEVEL RESOURCE LIMITS FOR OPERATING SYSTEM PARTITIONS

(75) Inventors: Ozgur C. Leonard, San Mateo, CA (US); Andrew G. Tucker, Menlo Park, CA (US); Stephen C. Hahn, Redwood City, CA (US)

(73) Assignee: Oracle America, Inc., Redwood City, CA (US)

( * ) Notice: Subject to any disclaimer, the term of this patent is extended or adjusted under 35 U.S.C. 154(b) by 1128 days.

(21) Appl. No.: 10/771,698

(22) Filed: Feb. 3, 2004

Related U.S. Application Data

(60) Provisional application No. 60/469,558, filed on May 9, 2003.

(51) Int. Cl.
*G06F 9/46* (2006.01)
(52) U.S. Cl. ...................................... 718/104
(58) Field of Classification Search ............... 718/1, 718/104; 709/104; 717/100
See application file for complete search history.

(56) References Cited

U.S. PATENT DOCUMENTS

| | | | |
|---|---|---|---|
| 5,155,809 A | 10/1992 | Baker et al. | |
| 5,283,868 A | 2/1994 | Baker et al. | |
| 5,291,597 A | 3/1994 | Shorter et al. | |
| 5,325,517 A | 6/1994 | Baker et al. | |
| 5,325,526 A | 6/1994 | Cameron et al. | |
| 5,345,590 A | 9/1994 | Ault et al. | |
| 5,437,032 A | 7/1995 | Wolf et al. | |
| 5,590,314 A | 12/1996 | Ueno et al. | |
| 5,682,530 A | 10/1997 | Shimamura | |
| 5,784,706 A | 7/1998 | Oberlin et al. | |
| 5,841,869 A | 11/1998 | Merkling et al. | |

(Continued)

FOREIGN PATENT DOCUMENTS

EP 389151 A2 9/1990

(Continued)

OTHER PUBLICATIONS

Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).

(Continued)

*Primary Examiner*—Meng-Ai An
*Assistant Examiner*—Eric C Wai
(74) *Attorney, Agent, or Firm*—Osha • Liang LLP

(57) ABSTRACT

A mechanism is provided for implementing multi-level resource control in operating system partitions. In one implementation, one or more non-global partitions may be established within a global operating system environment provided by an operating system. Each non-global partition may have one or more projects executing therein, and each project may comprise one or more processes. Each non-global partition may have associated therewith a first resource limit. This resource limit indicates how much of a particular resource has been allocated to the non-global partition as a whole. Each project executing within a non-global partition may have associated therewith a second resource limit. This limit indicates what amount of the particular resource allocated to the non-global partition has been allocated to that project. By setting multiple limits in this manner, it is possible to control resource allocation at multiple levels.

15 Claims, 10 Drawing Sheets

U.S. PATENT DOCUMENTS

| | | |
|---|---|---|
| 5,845,116 A | 12/1998 | Saito et al. |
| 5,925,102 A | 7/1999 | Eilert et al. |
| 5,963,911 A | 10/1999 | Walker et al. |
| 5,983,270 A | 11/1999 | Abraham et al. |
| 6,064,811 A | 5/2000 | Spilo et al. |
| 6,074,427 A | 6/2000 | Fought et al. |
| 6,075,938 A | 6/2000 | Bugnion et al. |
| 6,247,109 B1 | 6/2001 | Kleinsorge et al. |
| 6,279,046 B1 | 8/2001 | Armstrong et al. |
| 6,289,462 B1 | 9/2001 | McNabb et al. |
| 6,356,915 B1 | 3/2002 | Chtchetkine et al. |
| 6,438,594 B1 | 8/2002 | Bowman-Amuah |
| 6,557,168 B1 | 4/2003 | Czajkowski |
| 6,633,963 B1 | 10/2003 | Ellison et al. |
| 6,681,238 B1 | 1/2004 | Brice et al. |
| 6,681,258 B1 | 1/2004 | Ratcliff et al. |
| 6,701,460 B1 | 3/2004 | Suwandi et al. |
| 6,725,457 B1 | 4/2004 | Priem et al. |
| 6,738,832 B2 | 5/2004 | Burr et al. |
| 6,792,514 B2 | 9/2004 | Kapoor et al. |
| 6,813,766 B2 | 11/2004 | Hay |
| 6,859,926 B1 | 2/2005 | Brenner et al. |
| 6,938,169 B1 | 8/2005 | Caronni et al. |
| 6,944,699 B1 | 9/2005 | Bugnion et al. |
| 6,957,435 B2 | 10/2005 | Armstrong et al. |
| 6,961,941 B1 | 11/2005 | Nelson et al. |
| 6,993,762 B1 | 1/2006 | Pierre |
| 7,027,463 B2 | 4/2006 | Mathew et al. |
| 7,032,222 B1 * | 4/2006 | Karp et al. .................. 718/104 |
| 7,051,340 B2 | 5/2006 | Fisher et al. |
| 7,076,633 B2 | 7/2006 | Tormasov et al. |
| 7,076,634 B2 | 7/2006 | Lambeth et al. |
| 7,095,738 B1 | 8/2006 | Desanti |
| 7,096,469 B1 | 8/2006 | Kubala et al. |
| 7,099,948 B2 | 8/2006 | Tormasov et al. |
| 7,103,745 B2 | 9/2006 | Koning et al. |
| 7,188,120 B1 | 3/2007 | Leonard et al. |
| 7,194,439 B2 | 3/2007 | Kassan et al. |
| 7,225,223 B1 * | 5/2007 | McCarthy et al. ........... 709/204 |
| 7,363,495 B2 | 4/2008 | Felt et al. |
| 7,461,144 B1 | 12/2008 | Beloussov et al. |
| 2002/0069369 A1 | 6/2002 | Tremain |
| 2002/0083367 A1 | 6/2002 | McBride et al. |
| 2002/0120660 A1 | 8/2002 | Hay et al. |
| 2002/0156824 A1 | 10/2002 | Armstrong et al. |
| 2002/0161817 A1 | 10/2002 | Dorofeev et al. |
| 2002/0173984 A1 | 11/2002 | Robertson et al. |
| 2002/0174215 A1 | 11/2002 | Schaefer |
| 2003/0014466 A1 | 1/2003 | Berger et al. |
| 2003/0037092 A1 | 2/2003 | McCarthy et al. |
| 2003/0069939 A1 | 4/2003 | Russell |
| 2004/0010624 A1 | 1/2004 | Garofalo et al. |
| 2004/0162914 A1 | 8/2004 | St. Pierre et al. |
| 2004/0210760 A1 | 10/2004 | McGrath et al. |
| 2004/0215848 A1 | 10/2004 | Craddock et al. |
| 2005/0021788 A1 | 1/2005 | Tucker et al. |
| 2005/0076326 A1 * | 4/2005 | McMillan et al. ........... 717/100 |

FOREIGN PATENT DOCUMENTS

| | | | |
|---|---|---|---|
| EP | 1043658 | A1 | 10/2000 |
| EP | 1 253 516 | A2 | 10/2002 |
| EP | 1253516 | A2 | 10/2002 |
| EP | 1228038 | A2 | 2/2003 |
| EP | 1300766 | A | 4/2003 |
| WO | WO 00/45262 | A2 | 8/2000 |

OTHER PUBLICATIONS

Sun Microsystems, Inc. entitled Server Virtualization with Trusted Solaris™ 8 Operating Environment, by Glenn Faden, Sun BluePrints™ OnLine—Feb. 2002, http://www.sun.com/blueprints, (21 pgs).

Network Working Group entitled "IP Version 6 Addressing Architecture", by R. hinden, Nokia, S. Deering, Cisco System, dtd Jul. 1998, (28 pgs).

IBM entitled Partitioning for the IBM eserver pSeries 690 System, © Copyright IBM Corp. 2001 (12 pgs).

IBM System Partitioning on IBM eserver xSeries Servers entitled "Effective Server Consolidation and Resource Management with System Partitioning" by Mark T. Chapman, IBM Server Group, dtd Dec. 2001, (23 pgs).

Virtual Private Servers and Security Contexts, dtd May 10, 2004, http://www.solucorp.qc.ca/miscprj/s_content.hc?prjstate=1&nodoc=0, (2 pgs).

SunSoft, a Sun Microsystems, Inc. Business entitled "File System Administration", © 1994 Sun Microsystems, Inc., (62 pgs).

Jails: Confining the omnipotent root., by Poul-Henning Kamp and Robert N.M. Watson, entitled "The FreeBSD Project", http://www.servetheweb.com/, (15 pgs).

Czajkowski, G., "Application isolation in the Java Virtual Machine", 2000, ACM Press, Proceedings of the 15$^{th}$ ACM SIGPLAN Conference on Object-Oriented Programming, Systems, Languages, and Applications, pp. 354-366.

Czajkowski, G., "Multitasking without compromise: a virtual machine evolution", ACM Press, Proceedings of the 16$^{th}$ ACM SIGPLAN Conference on Object Oriented Programming, Systems, Languages, and Applications, dated Oct. 2001, pp. 125-138.

Osman, S., et al., "The design and implementation of Zap: a system for migrating computing environments", SIGOPS Operating System, Rev. 36, SI, dated Dec. 2000, pp. 361-376.

Presotto et al., "Interprocess Communication in the Ninth Edition Unix System", John Wiley & Sons, Ltd., dated Mar. 1990, 4 pages.

Stevens, "Advanced programming in the Unix Environment", Addison-Wesley, 1993, pp. 427-436.

Watson, "TrustedBSD—Adding Trusted Operating System Features to FreeBSD", The USENIX Association, 2001, 14 pages.

Noordende et al., "Secure and Portable Confinement of Untrusted Programs", ACM, 2002, 14 pages.

Hope, "Using Jails in FreeBSD for fun and profit", ;Login: The Magazine of USENIX &SAGE, vol. 27, No. 3, dated Jun. 2002, pp. 48-55.

Hewlett-Packard, "Installing and Managing HP-UX Virtual Partitions (vPars)", Third Edition, Part No. T1335-90018, Copyright Hewlett-Packard Company, Nov. 2002, pp. 1-4, 17-44, 72-75, and 157-161.

Hope, Paco, "Using Jails in FreeBSD for Fun and Profit", ;Login: The Magazine of Usenix and Sage, vol. 27, No. 3, Jun. 2002, 9 pages.

Kamp, Poul-Henning, "Rethinking / dev and devices in the UNIX kernel", BSDCon 2002 Paper, retrieved from website <http://www.usenix.org/events/bsdcon02/full_papers/kamp/kamp_html/index.html> Printed May 1, 2007, 18 pages.

Thompson, K., "UNIX Implementation", Bell Laboratories, The Bell System Technical Journal, 1978, pp. 1-9.

European Patent Office, "European Search Report," application No. 04252689.7, mailing date Jul. 28, 2005, 3 pages.

Current Claims, European patent application 04252689.7, 6 pages.

Sun Microsystems, "Sun Enterprise™ 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.

Overview of Bandwidth Broker System [online], [retrieved on Jan. 31, 2005]. Retrieved from the internet: <URL: http://www.ittc.ku.edu/~kdrao/845/into.html>, (19 pgs).

QBone Signaling Design Team Final Report [online], [retrieved on Jan. 31, 2005]. Retrieved from the internet: <URL: http://qos.internet2.edu/wg/documents-informational/20020709-chimento-etal-qbone-signaling.>, (33 pgs).

Official Action from EPO for foreign patent application No. 04 252 690.5-2211 dated Jun. 10, 2005 (6 pgs)—attached.

Current Claims in EPO patent application No. 04 252 690.5-2211 (9 pgs)—attached.

European Search Report from the European Patent Office for Foreign Patent Application No. 04252690.5 (3 pgs.).

Claims As Filed in European Patent Application No. 04252690.5 (6 pgs.).

Mc Dougall, Richard, et al., "Resource Management", Prentice Hall, 1999, 25 pages.

European Patent Office, "Result of Consultation", Application No. 04252689.7-1243, dated Aug. 11, 2008, 2 pages.

Claims, Application No. 04252689.7-1243, 6 pages.

* cited by examiner

MULTI-LEVEL RESOURCE LIMITS FOR OPERATING SYSTEM PARTITIONS

RELATED APPLICATIONS

This application claims priority to U.S. Provisional Application Ser. No. 60/469,558, filed May 9, 2003, entitled OPERATING SYSTEM VIRTUALIZATION by Andrew G. Tucker, et. al., the entire contents of which are incorporated herein by this reference. The present application contains subject matter that may be related to the subject matter in: U.S. Pat. No. 7,478,139 ("SHARED RESOURCE SUPPORT FOR INTERNET PROTOCOL") filed Apr. 29, 2002; U.S. Pat. No. 6,279,046 ("EVENT-DRIVEN COMMUNICATIONS INTERFACE FOR LOGICALLY PARTITIONED COMPUTER"), filed May 19, 1999; U.S. Pat. No. 7,076,634 ("ADDRESS TRANSLATION MANAGER AND METHOD FOR A LOGICALLY PARTITIONED COMPUTER SYSTEM"), filed Apr. 24, 2003; U.S. Patent Publication No. 2004/0162914 ("SYSTEM AND METHOD OF EXTENDING VIRTUAL ADDRESS RESOLUTION FOR MAPPING NETWORKS") filed Feb. 13, 2003; U.S. Pat. No. 5,784,706 ("VIRTUAL TO LOGICAL TO PHYSICAL ADDRESS TRANSLATION FOR DISTRIBUTED MEMORY MASSIVELY PARALLEL PROCESSING SYSTEMS") filed Dec. 13, 1993; U.S. Pat. No. 7,095,738 ("SYSTEM AND METHOD FOR DERIVING IPV6 SCOPE IDENTIFIERS AND FOR MAPPING THE IDENTIFIERS INTO IPV6 ADDRESSES") filed May 7, 2002; U.S. Pat. No. 6,920,485 ("PACKET PROCESSING IN SHARED MEMORY MULTI-COMPUTER SYSTEMS") filed Oct. 4, 2001; U.S. Pat. No. 6,681,258 ("VIRTUAL MACHINE MONITORS FOR SCALABLE MULTIPROCESSORS") filed Jun. 10, 1998; U.S. Pat. No. 6,681,258 ("FACILITY FOR RETRIEVING DATA FROM A NETWORK ADAPTER HAVING A SHARED ADDRESS RESOLUTION TABLE") filed May 31, 2000; U.S. Pat. No. 5,841,869 ("METHOD AND APPARATUS FOR TRUSTED PROCESSING") filed Aug. 23, 1996; U.S. patent application Ser. No. 10/767,118 ("MECHANISM FOR IMPLEMENTING A SPARSE FILE SYSTEM FOR AN OPERATING SYSTEM PARTITION") filed Jan. 28, 2004; U.S. Pat. No. 7,389,512 ("INTERPROCESS COMMUNICATION WITHIN OPERATING SYSTEM PARTITIONS") filed Jan. 27, 2004; U.S. Pat. No. 7,461,080 ("SYSTEM LOGGING WITHIN OPERATING SYSTEM PARTITIONS USING LOG DEVICE NODES THAT ARE ACCESS POINTS TO A LOG DRIVER") filed Dec. 22, 2003; U.S. Pat. No. 7,437,556 ("GLOBAL VISIBILITY CONTROLS FOR OPERATING SYSTEM PARTIITONS") filed Jan. 21, 2004; U.S. Patent Publication No. 2004/0226019 ("FINE-GRAINED PRIVILEGES IN OPERATING SYSTEM PARTITIONS") filed Jan. 30, 2004; U.S. Pat. No. 7,526,774 ("TWO-LEVEL SERVICE MODEL IN OPERATING SYSTEM PARTITIONS") filed Jan. 20, 2004; U.S. Pat. No. 7,337,445 ("VIRTUAL SYSTEM CONSOLE FOR VIRTUAL APPLICATION ENVIRONMENT") filed Jan. 28, 2004; U.S. Pat. No. 7,188,120 ("SYSTEM STATISTICS VIRTUALIZATION FOR OPERATING SYSTEMS PARTITIONS") filed on Jan. 20, 2004; U.S. Pat. No. 7,490,074 ("MECHANISM FOR SELECTIVELY PROVIDING MOUNT INFORMATION TO PROCESSES RUNNING WITHIN OPERATING SYSTEM PARTITIONS") filed Jan. 28, 2004; U.S. Patent Publication No. 2004/0226017 ("MECHANISM FOR ASSOCIATING RESOURCE POOLS WITH OPERATING SYSTEM PARTITIONS") filed on Jan. 29, 2004; International Publication No. WO/2000/045262; U.S. patent application Ser. No. 10/767,117; and U.S. patent application Ser. No. 10/762,067.

BACKGROUND

In many computer implementations, it is desirable to be able to specify what amount of resources may be consumed by which entities. For example, it may be desirable to specify that a certain group of applications is allowed to consume an X amount of a set of resources, while another group of applications is allowed to consume a Y amount of the resources. This ability to allocate resources to specific entities enables a system administrator to better control how the resources of a system are used. This control may be used in many contexts to achieve a number of desirable results, for example, to prevent certain processes from consuming an inordinate amount of resources, to enforce fairness in resource usage among various entities, to prioritize resource usage among different entities, etc. Current systems allow certain resources to be allocated to certain entities. For example, it is possible to limit the total consumption of shared memory by certain groups of processes. However, the level of control that is possible with current systems is fairly limited.

SUMMARY

In accordance with one embodiment of the present invention, there is provided a mechanism for implementing multi-level resource control in operating system partitions. With this mechanism, it is possible to control resource allocation at multiple levels of an operating system environment.

In one embodiment, one or more non-global partitions may be established within a global operating system environment provided by an operating system. Each non-global partition serves to isolate the processes running within that partition from the other non-global partitions within the global operating system environment. In one embodiment, each non-global partition may have one or more projects executing therein, and each project may comprise one or more processes.

Each non-global partition may have associated therewith a first resource limit. This resource limit indicates a maximum amount of a particular resource (e.g. shared memory) that can be allocated to the non-global partition as a whole. In one embodiment, the first resource limit is assigned by a global administrator. By specifying a resource limit for a non-global partition, the global administrator is in effect specifying how much of that resource is available to all of the projects and processes within that non-global partition.

In one embodiment, each project executing within a non-global partition may have associated therewith a second resource limit. This limit indicates what amount of the particular resource that can be allocated to the non-global partition can be allocated to that project. In one embodiment, the second resource limit is assigned by a non-global administrator responsible for administering the non-global partition.

From the above discussion, it is clear that this embodiment of the present invention enables the allocation of the particular resource to be controlled at multiple levels. More specifically, the global administrator can control what amount of the resource can be allocated to a non-global partition as a whole, and the non-global administrator can control how that amount of the particular resource can be allocated to the various projects within that non-global partition. This ability to control resource allocation at multiple levels makes it possible to exercise better control over how resources are used in a computer system.

DETAILED DESCRIPTION OF EMBODIMENTS(S)

Conceptual Overview

Figure 9:
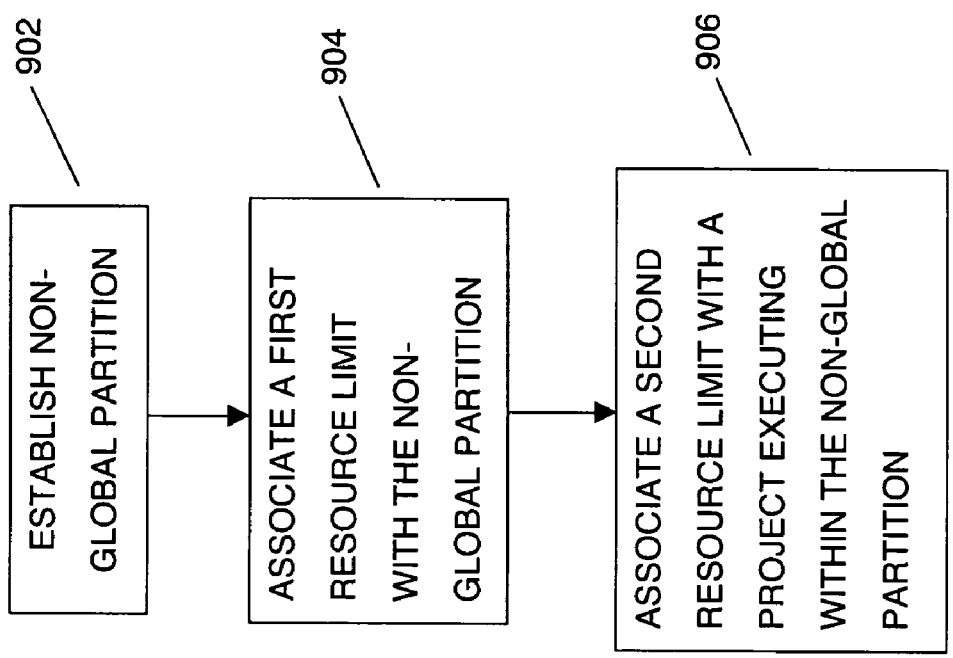
FIG. 9 is an operational flow diagram, which provides a high level overview of one embodiment of the present invention.

In accordance with one embodiment of the present invention, there is provided a mechanism for implementing multi-level resource control in operating system partitions. With this mechanism, it is possible to control resource allocation at multiple levels of an operating system environment. An operational flow diagram, which provides a high level overview of this embodiment of the present invention, is shown in FIG. 9.

In one embodiment, one or more non-global partitions may be established (block 902) within a global operating system environment provided by an operating system. Each non-global partition serves to isolate the processes running within that partition from the other non-global partitions within the global operating system environment. In one embodiment, each non-global partition may have one or more projects executing therein, and each project may comprise one or more processes.

Each non-global partition may have associated (block 904) therewith a first resource limit. This resource limit indicates a maximum amount of a particular resource (e.g. shared memory) that can be allocated to the non-global partition as a whole. In one embodiment, the first resource limit is assigned by a global administrator. By specifying a resource limit for a non-global partition, the global administrator is in effect specifying how much of that resource is available to all of the projects and processes within that non-global partition.

In one embodiment, each project executing within a non-global partition may have associated (block 906) therewith a second resource limit. This limit indicates what amount of the particular resource that can be allocated to the non-global partition can be allocated to that project. In one embodiment, the second resource limit is assigned by a non-global administrator responsible for administering the non-global partition.

From the above discussion, it is clear that this embodiment of the present invention enables the allocation of the particular resource to be controlled at multiple levels. More specifically, the global administrator can control what amount of the resource can be allocated to a non-global partition as a whole, and the non-global administrator can control how that amount of the particular resource can be allocated to the various projects within that non-global partition. This ability to control resource allocation at multiple levels makes it possible to exercise better control over how resources are used in a computer system.

System Overview

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
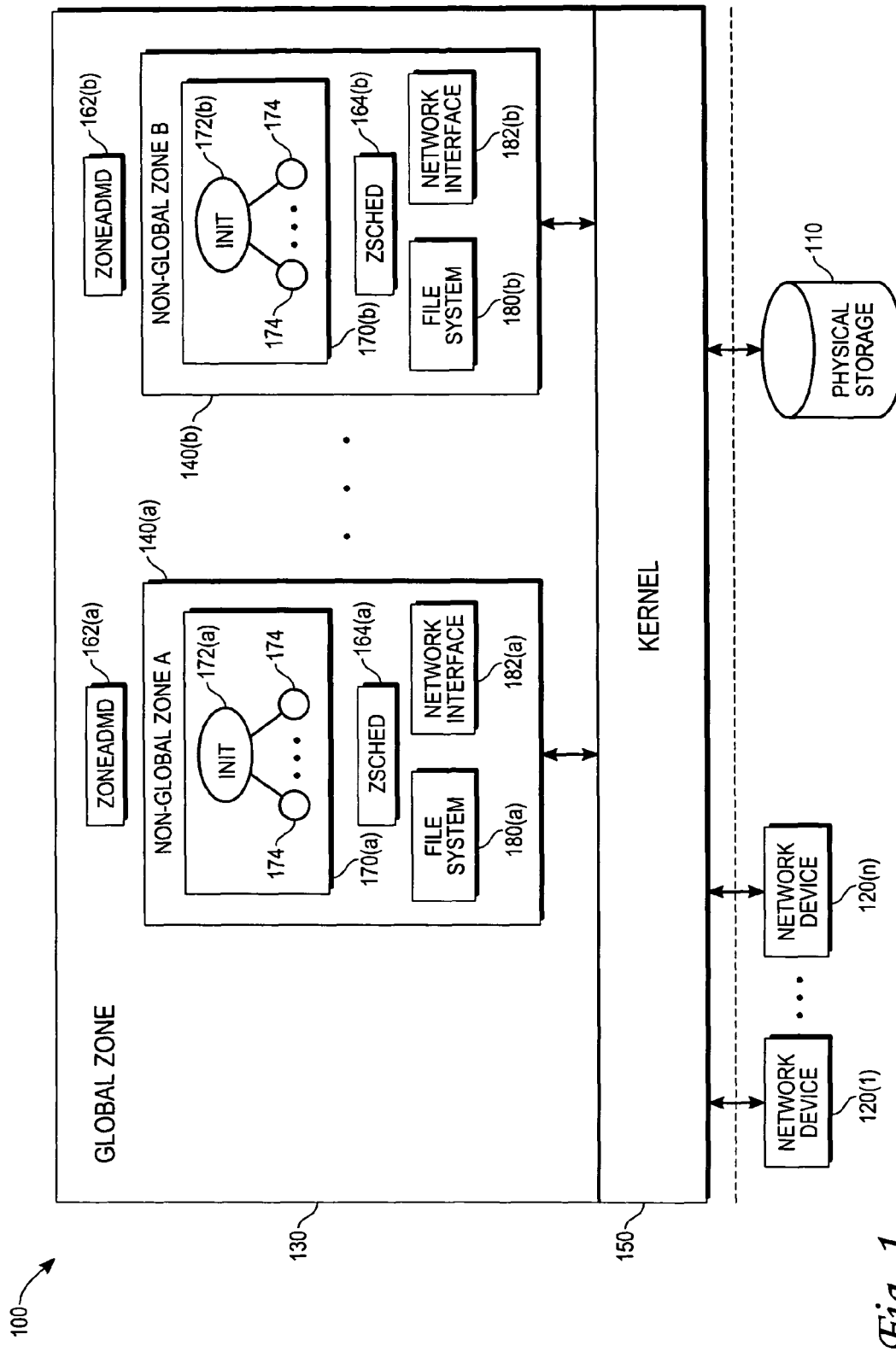
FIG. 1 is a functional diagram of an operating system environment comprising a global zone and one or more non-global zones, in accordance with one embodiment of the present invention.

FIG. 1 illustrates a functional block diagram of an operating system (OS) environment 100 in accordance with one embodiment of the present invention. OS environment 100 may be derived by executing an OS in a general-purpose computer system, such as computer system 800 illustrated in FIG. 8, for example. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows, MacOS, etc.

As shown in FIG. 1, OS environment 100 may comprise one or more zones (also referred to herein as partitions), including a global zone 130 and zero or more non-global zones 140. The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. One of the purposes of the non-global zones 140 is to provide isolation. In one embodiment, a non-global zone 140 can be used to isolate a number of entities, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system 180 of another zone, nor can they access or affect the network interface 182 of another zone. As a result, the processes 170 in a non-global zone 140 are limited to accessing and affecting the processes and entities in that zone. Isolated in this manner, each non-global zone 140 behaves like a virtual standalone computer. While processes 170 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many applications. For example, if a single computer system running a single instance of an OS is to be used to host applications for different competitors (e.g. competing websites), it would be desirable to isolate the data and processes of one competitor from the data and processes of another competitor. That way, it can be ensured that information will not be leaked between the competitors. Partitioning an OS environment 100 into non-global zones 140 and hosting the applications of the competitors in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150. More specifically, it is the kernel 150 that ensures that processes 170 in one non-global zone 140 are not able to access or affect processes 170, file systems 180, and network interfaces 182 of another zone (non-global or global). In addition to enforcing the zone boundaries, kernel 150 also provides a number of other services. These services include but are certainly not limited to mapping the network interfaces 182 of the non-global zones 140 to the physical network devices 120 of the computer system, and mapping the file systems 180 of the non-global zones 140 to an overall file system and a physical storage 110 of the computer system. The operation of the kernel 150 will be discussed in greater detail in a later section.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1 m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of one or more file systems to be mounted when the zone is created, specification of zero or more network interfaces, specification of devices to be configured when the zone is created, resource limits for the zone, and zero or more resource pool associations.

Once a zone is in the Configured state, a global administrator may invoke another operating system utility (in one embodiment, zoneadm(1 m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1 m) again), with a zoneadmd process 162 to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In establishing a non-global zone 140, a number of operations may be performed, including but not limited to assigning a zone ID, starting a zsched process 164 (zsched is a kernel process; however, it runs within the non-global zone 140, and is used to track kernel resources associated with the non-global zone 140), mounting file systems 180, plumbing network interfaces 182, configuring devices, and setting resource controls. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer. Notice that when a non-global zone 140 is in the Ready state, no user or non-kernel processes are executing inside the zone (recall that zsched is a kernel process, not a user process). Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a non-global zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Multi-Level Resource Control

As noted previously, one embodiment of the present invention allows resource allocation limits to be set at multiple levels. In one embodiment, a global zone administrator (also referred to herein as a global administrator) can set zone resource limits at a zone level. A non-global zone administrator (also referred to herein as a non-global administrator) can set project resource limits at a project level within a zone. As used herein, the term project refers broadly to a group of one or more processes running within a zone.

Figure 2:
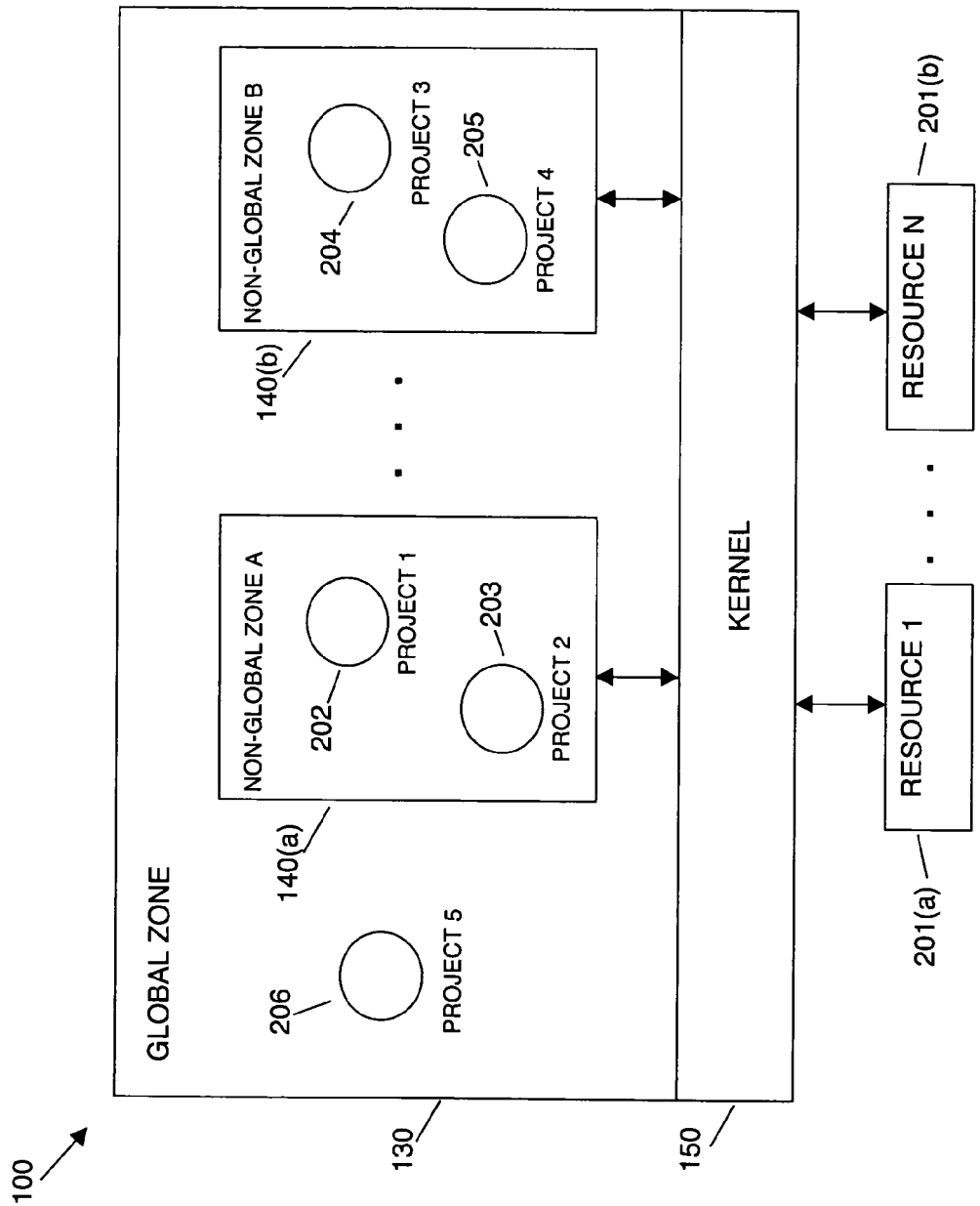
FIG. 2 is a functional diagram of an operating system environment comprising a global zone and one or more non-global zones containing projects and sharing resources, in accordance with one embodiment of the present invention.

FIG. 2 illustrates a functional diagram of the OS environment 100 with zones 140 sharing resources 201. As noted above, zones contain processes that are executed by an init process. The global and non-global zone administrators have the ability to define an abstract called a project in a zone to track processes. Each zone 130, 140 can contain one or more projects. In this example, zone A 140(a) contains Project 1 202 and Project 2 203, zone B 140(b) contains Project 3 204 and Project 4 205, and the global zone 130 contains Project 5 206.

In one embodiment, a global zone administrator is allowed to set resource limits for zones 140. Limits can be set for any resource that is available to a zone, e.g., locked memory, number of active processes, processor share, number of semaphores, ports, message queues, etc. A non-global zone administrator is allowed to set resource limits for projects 202-205 within a zone 140. The non-global zone administrator can look at the zone limits that have been set by the global zone administrator, but cannot modify the values. A global zone administrator can set resource limits for projects 206 in the global zone.

Figure 3:
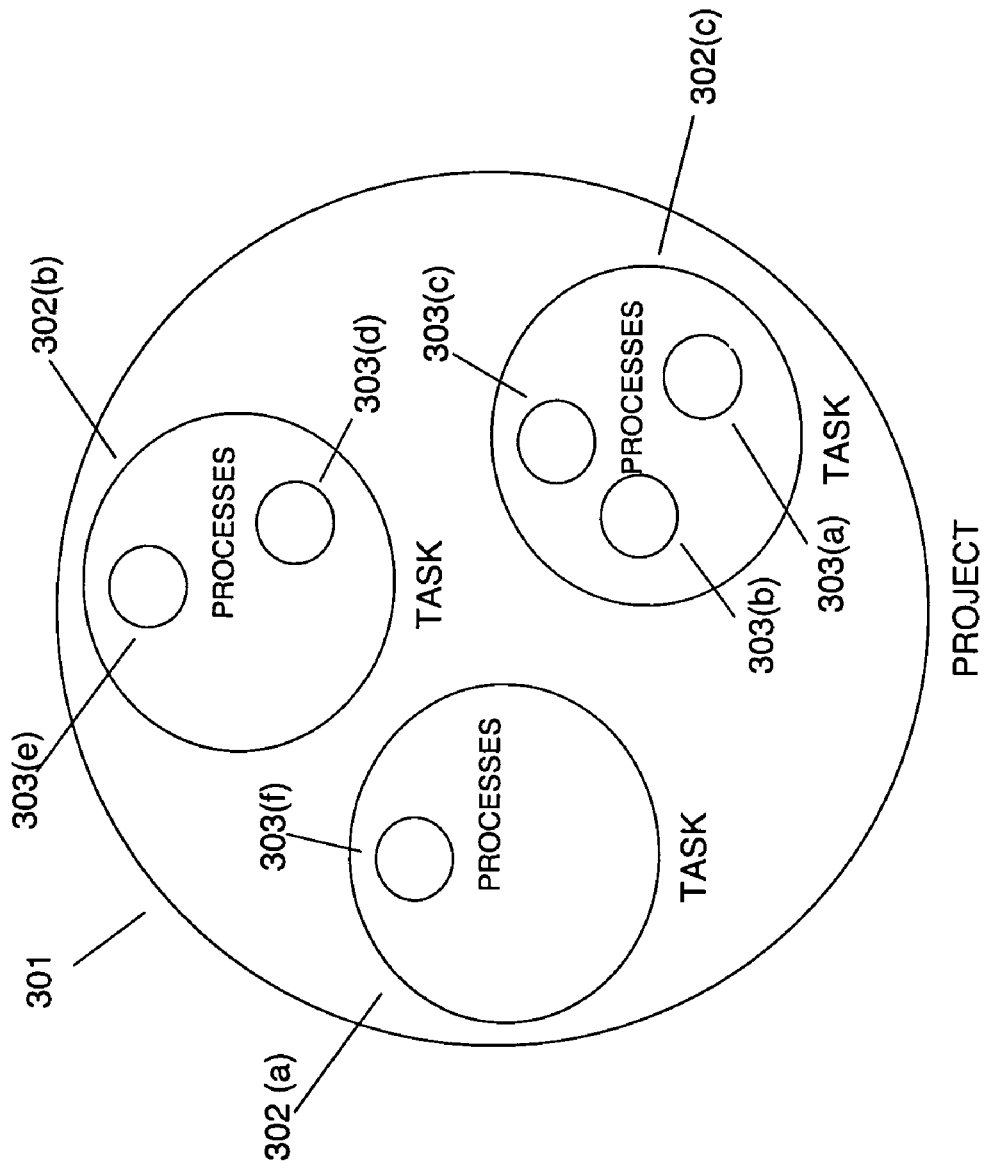
FIG. 3 is a functional diagram that graphically illustrates the composition of a project, in accordance with one embodiment of the present invention.

FIG. 3 illustrates the composition of a project in one embodiment. The project 301 is composed of one or more tasks 302. Each task 302 is further comprised of processes 302. A project is a member of only one zone. Projects and tasks are levels of abstraction that allow a non-global zone administrator to logically group one or more processes. As each process runs, it makes requests for resources to the kernel 150. The kernel 150 keeps track of which process is part of which project. A non-global zone administrator can further refine his resource limits down to the task and process level, if desired. For readability reasons, resource limits at the project level will be discussed herein with the understanding that task and process resource limits are a natural extension of the method described.

When a process within a project makes a resource request, the kernel 150 checks the project's resource limit to see if the resource can be allocated to the process. If the project's resource usage is less than the project's limit, then the kernel 150 may be able to allocate the resource to the process up to the project limit. However, before any allocation occurs, the kernel 150 first checks the zone limit of the zone in which the project is executing. Even though granting the request would keep the consumption below the project limit, it may cause it to go over its zone-level resource limit. If the zone is below its resource limit and the project is below its resource limit, then the kernel can allocate the resource to the process up to the project limit or zone limit, whichever is less.

Figure 4:
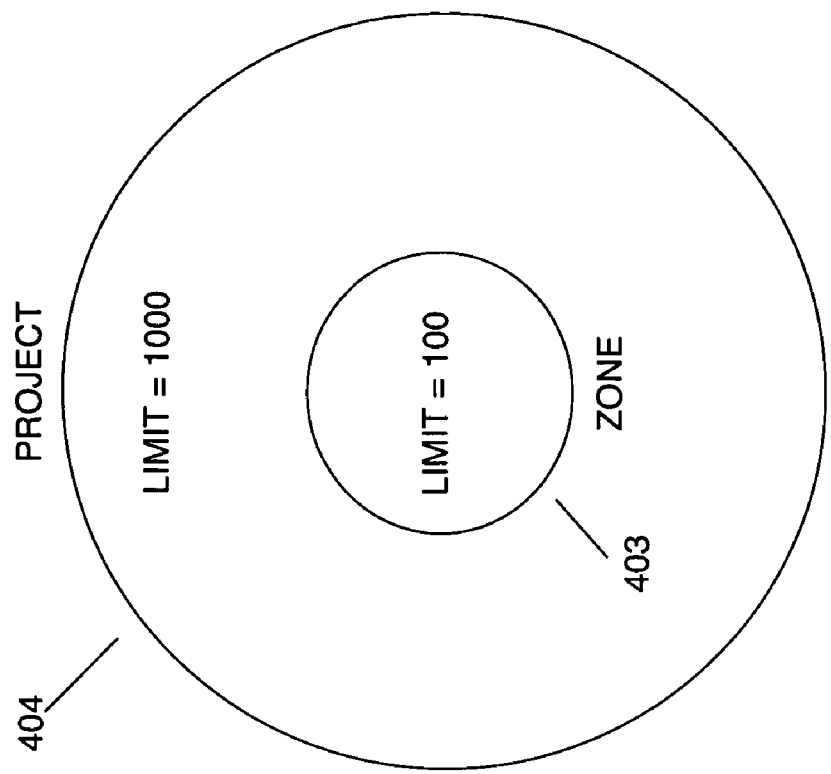
FIG. 4 is a functional diagram that graphically illustrates the relationship between zone resource limits and project resource limits, where a zone limit overrides a project limit, in accordance with one embodiment of the present invention.
Figure 4:
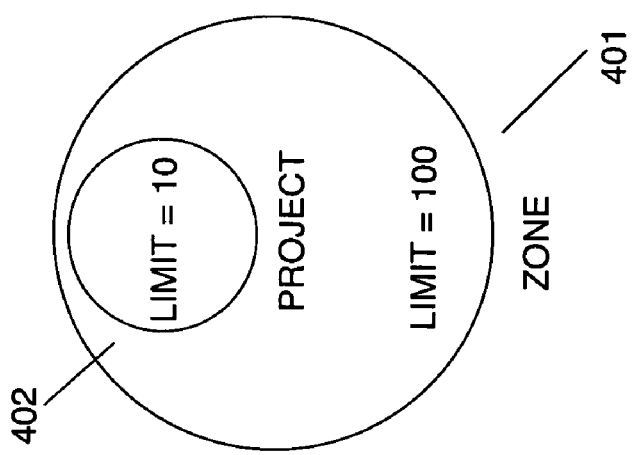

FIG. 4 illustrates the interaction between a zone limit and a project limit. In this example, a zone 401 has a limit for a resource set to 100 by a global zone administrator. A project 402 within the zone has had its limit for the same resource set to 10 by a non-global zone administrator. If the project is below its limit when a process within the project makes a request for the resource, and the total allocation for the resource for all projects within the zone is below the zone limit, then the kernel can allocate the resource to the process up to whatever is left of the project's allocation or the zone's allocation, whichever is less.

Another example illustrates the control of zone limits. The zone 403 has a limit of 100 for a particular resource. A non-global zone administrator has set the limit for the resource at 1000 for a project 404 within the zone 403. When a process within the project makes a request for the resource, the kernel can only allocate the resource up to the lowest limit. Since the zone 403 has a limit of 100, the total resource allocation for all projects in the zone can only be 100. It does not matter what the non-global zone administrator has set the resource limits at for the projects within the zone because the total usage must be less than or equal to the zone limit. The zone limit overrides the limit that is set by the non-global zone administrator. This gives the global zone administrator control over errant or malicious non-global zone administrators.

Figure 5:
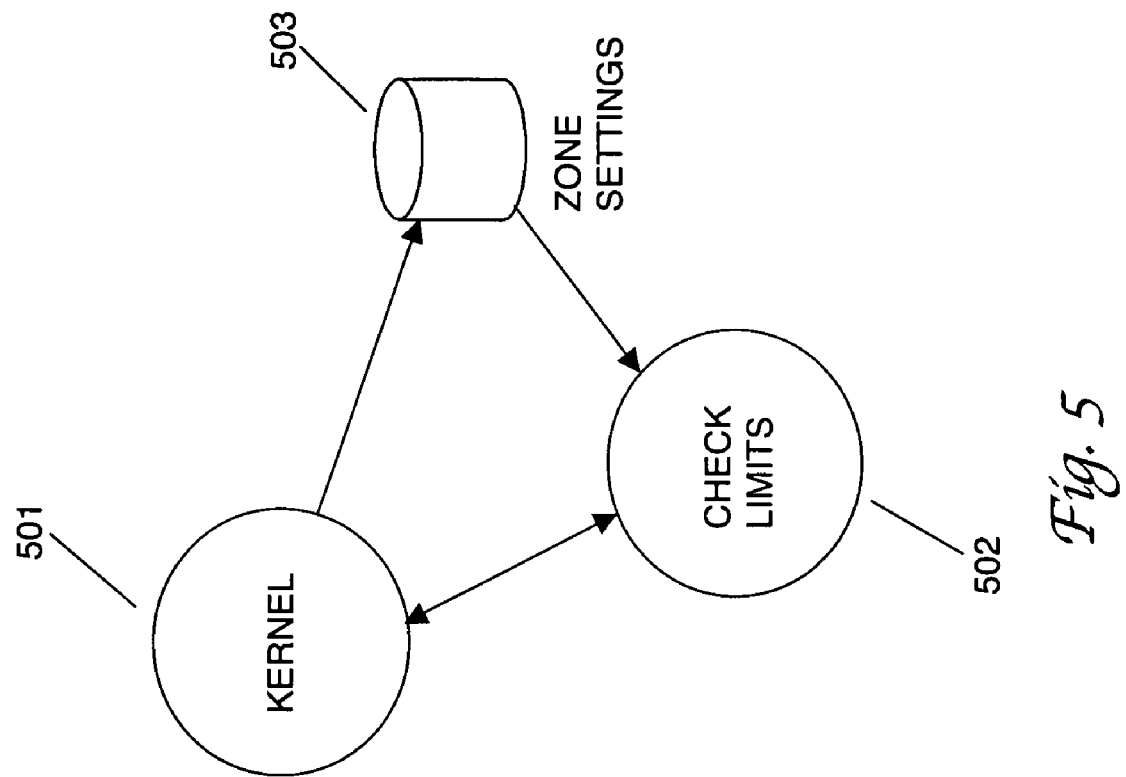
FIG. 5 is a functional diagram that illustrates a task level viewpoint of one embodiment of the present invention that services process resource allocation requests, in accordance with one embodiment of the present invention.

FIG. 5 is a task viewpoint of one embodiment of the present invention. The kernel 501 (which coincides with kernel 150 of FIG. 1) records zone resource limits set by the global zone administrator, and project resource limits set by the non-global zone administrators in the zone settings storage 503. The kernel 501 services requests for resources made by running processes.

Figure 10:
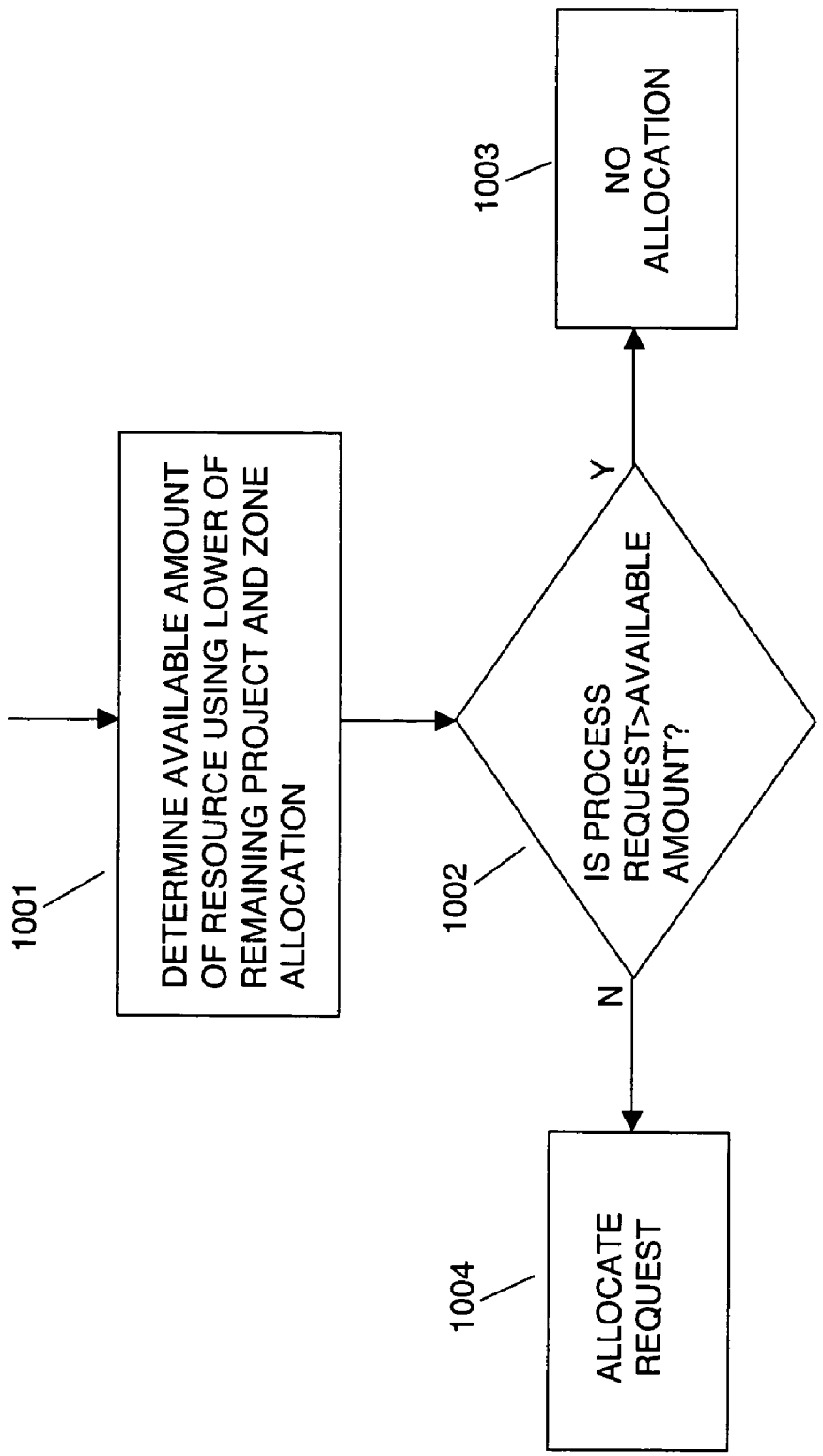
FIG. 10 is a flowchart illustrating the determination of computing resource allocation to a process, in accordance with one embodiment of the present invention.

When a process makes a resource request, the kernel 501 passes the request to the check limits module 502. The check limits module 502 looks up the resource limits for the process' project and zone in the zone settings storage 503. The check limits module 502 will approve the process' resource request only if the project is below its limit and the zone is also below its limit for that particular resource. As shown in FIG. 10, the amount of the resource that is approved depends on the project and zone limits. The amount of the resource that is available for allocation is determined by the amount that remains of the project allocation and the amount that remains of the zone allocation. The lower of the two values indicates the available amount that can be allocated to the process 1001. If the process' request is less than or equal to the available amount 1002, then the process receives the full amount of the resource that it is requesting 1004. If the process' request is greater than the available amount 1002, then the process will receive nothing, resulting in a denied request 1003. Optionally, if the process' request is greater than the available amount, then the process will only receive the available amount.

In one embodiment, the check limits module 502 records a running total of the amount of the resource that is allocated to each project and each zone in the zone settings storage 503. The totals are updated upon allocation of a resource. This allows the check limits module 502 to respond faster to the kernel 501.

Figure 6:
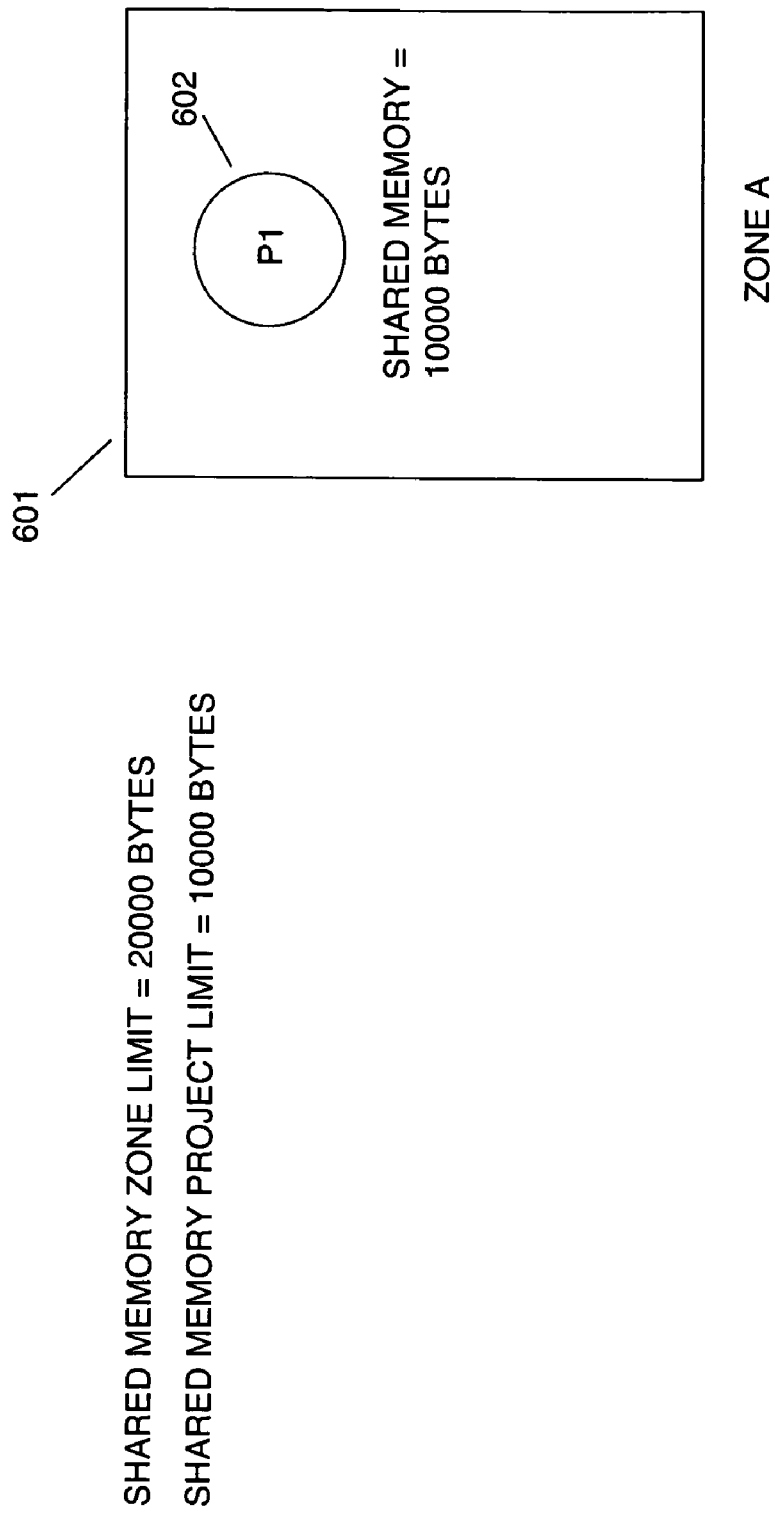
FIG. 6 is a functional diagram that graphically illustrates a project within a zone requesting a shared memory allocation with project and zone shared memory limits imposed, in accordance with one embodiment of the present invention.

FIG. 6 illustrates an example where a zone shared memory limit for zone A 601 has been set to 20000 bytes, and the project shared memory limit for a project 1 602 within zone A 601 has been set to 10000 bytes. A process within project P1 602 makes a request for one byte of shared memory. The kernel checks the amount of the resource that has already been allocated to project P1 602 and finds that 10000 bytes have already been allocated to project P1 602. The kernel checks the project shared memory limit and sees that the project shared memory limit is 10000 bytes. The kernel compares the project shared memory limit with the amount that has already been allocated to the project and finds that the project is already at its limit. The kernel denies the process' request.

Figure 7:
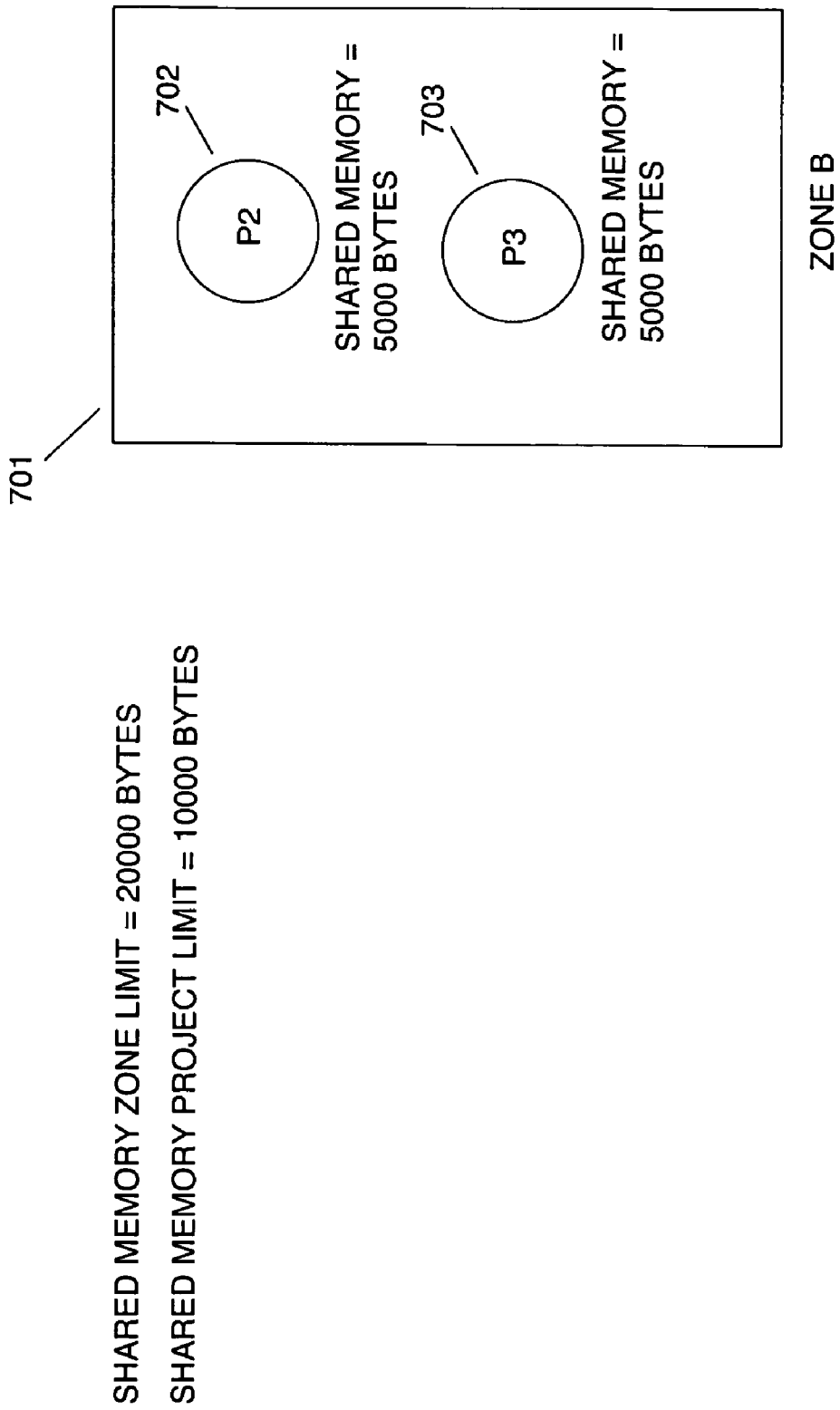
FIG. 7 is a functional diagram that graphically illustrates two projects within a zone requesting a shared memory allocation with project and zone shared memory limits imposed, in accordance with one embodiment of the present invention.

FIG. 7 illustrates an example where a zone shared memory limit for zone B 701 has been set to 20000 bytes, and the project shared memory limits for projects P2 702 and P3 703 within zone B 701 have been set to 10000 bytes each. A process within project P2 702 makes a request for one byte of shared memory. The kernel checks the amount of the resource that has already been allocated to project P2 702 and finds that 5000 bytes have already been allocated to project P2 702. The kernel checks the project shared memory limit and sees that the project shared memory limit is 10000 bytes. The kernel compares the project shared memory limit with the amount that has already been allocated to project P2 702 and finds that 5000 bytes can still be allocated to the project.

The kernel then calculates the total amount of shared memory that has been allocated to all active projects in zone B 701. The kernel adds the amount allocated to project P2 702 and project P3 703 and finds that 10000 bytes have already been allocated to zone B 701 as a whole. Comparing that value with the zone shared memory limit, the kernel finds that 10000 bytes can still be allocated to zone B 701.

The lower of the available project and zone amounts is the project amount, which is 5000 bytes. The kernel approves the process' request because the one byte request is less than 5000 bytes. The kernel can record the total shared memory allocated to projects and zones each time an allocation is made to save the time consumed by performing dynamic calculations at each allocation.

Suppose now that, rather than 5000 bytes, 15000 bytes have been allocated to project P3 703 (suppose further that the project limit for project P3 is 15000 bytes, not 10000 bytes). This would mean that the total shared memory already allocated to zone B as a whole has reached the zone limit of 20000 bytes. In such a case, even though the project limit has not been reached, the process' request will be denied because the zone limit has been reached.

Hardware Overview

Figure 8:
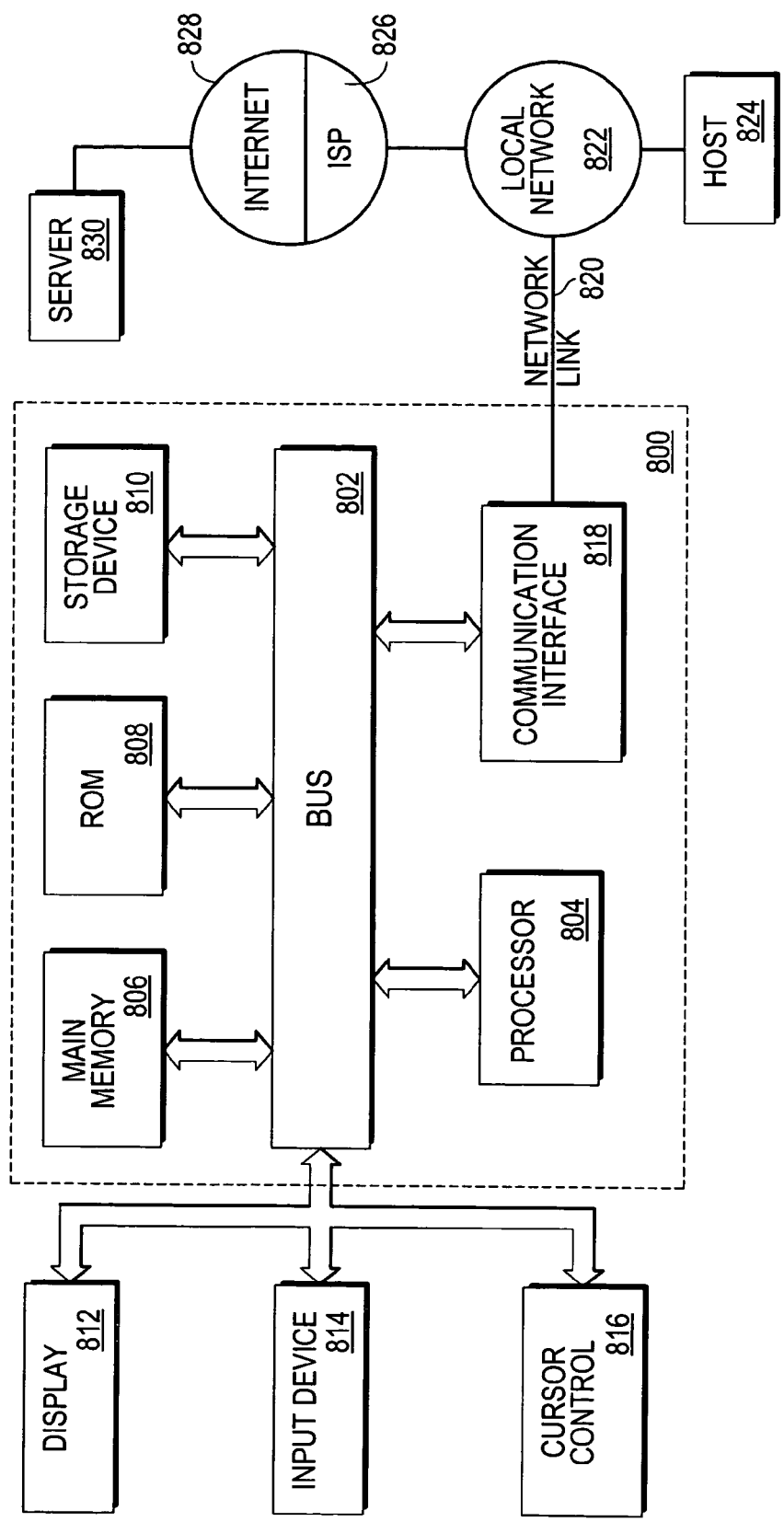
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 for facilitating information exchange, and one or more processors 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions by processor 804. Computer system 800 may further include a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

In computer system 800, bus 802 may be any mechanism and/or medium that enables information, signals, data, etc., to be exchanged between the various components. For example, bus 802 may be a set of conductors that carries electrical signals. Bus 802 may also be a wireless medium (e.g. air) that carries wireless signals between one or more of the components. Bus 802 may also be a medium (e.g. air) that enables signals to be capacitively exchanged between one or more of the components. Bus 802 may further be a network connection that connects one or more of the components. Overall, any mechanism and/or medium that enables information, signals, data, etc., to be exchanged between the various components may be used as bus 802.

Bus 802 may also be a combination of these mechanisms/media. For example, processor 804 may communicate with storage device 810 wirelessly. In such a case, the bus 802, from the standpoint of processor 804 and storage device 810, would be a wireless medium, such as air. Further, processor 804 may communicate with ROM 808 capacitively. In this instance, the bus 802 would be the medium (such as air) that enables this capacitive communication to take place. Further, processor 804 may communicate with main memory 806 via a network connection. In this case, the bus 802 would be the network connection. Further, processor 804 may communicate with display 812 via a set of conductors. In this instance, the bus 802 would be the set of conductors. Thus, depending upon how the various components communicate with each other, bus 802 may take on different forms. Bus 802, as shown in FIG. 8, functionally represents all of the mechanisms and/or media that enable information, signals, data, etc., to be exchanged between the various components.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine-implemented method, comprising:

establishing, within a global operating system environment provided by an operating system, a non-global partition which serves to isolate processes running within the non-global partition from at least one other non-global partition within the global operating system environment, wherein each of the non-global partitions share an operating system kernel with the global operating system environment, and wherein each of the non-global partitions comprises a distinct file system;

associating a first resource limit with the non-global partition, wherein the first resource limit indicates a maximum amount of a particular resource that may be allocated to the non-global partition;

associating a second resource limit with a first group of processes within the non-global partition, wherein the second resource limit indicates a maximum amount of the particular resource that may be allocated to the first group of processes;

associating a third resource limit with a second group of processes within the non-global partition, wherein the third resource limit indicates a maximum amount of the particular resource that may be allocated to the second group of processes;

receiving a resource allocation request for the particular resource from a process of the first group of processes;

determining an amount of the particular resource that may be allocated by calculating an available amount of the particular resource, wherein if the resource allocation request is less than or equal to the available amount, then the amount is set to the amount specified in the resource allocation request, wherein calculating the available amount comprises:

calculating a first amount by subtracting a total amount of the particular resource currently in use by the non-global partition from the first resource limit;

calculating a second amount by subtracting a total amount of the particular resource currently in use by the first group of processes from the second resource limit; and setting the available amount to the lower of the first amount and the second amount;

allocating the determined amount to the process of the first group of processes.

2. The method of claim 1, wherein a global partition administrator sets the first resource limit.

3. The method of claim 1, wherein a non-global partition administrator sets at least one selected from a group consisting of the second resource limit and the third resource limit.

4. The method of claim 1, wherein if the resource allocation request is greater than the available amount, then the determined amount is set to the available amount.

5. The method of claim 1, wherein if the resource allocation request is greater than the available amount, then the determined amount is set to zero.

6. A machine-readable storage medium having stored thereon at least a portion of an operating system the machine readable storage medium comprising:

establishing, within a global operating system environment provided by an operating system, a non-global partition, which serves to isolate processes running within the non-global partition from at least one other non-global partition within the global operating system environment, wherein each of the non-global operating system partitions share an operating system kernel with the global operating system environment, and wherein each of the non-global partitions comprises a distinct file system;

associating a first resource limit with the non-global partition, wherein the first resource limit indicates a maximum amount of a particular resource that may be allocated to the non-global partition;

associating a second resource limit with a first group of processes within the non-global partition, wherein the second resource limit indicates a maximum amount of the particular resource that may be allocated to the first group of processes;

associating a third resource limit with a second group of processes within the non-global partition, wherein the third resource limit indicates a maximum amount of the particular resource that may be allocated to the second group of processes;

receiving a resource allocation request for the particular resource from a process of the first group of processes;

determining an amount of the particular resource that may be allocated by calculating an available amount of the particular resource, wherein if the resource allocation request is less than or equal to the available amount, then the amount is set to the amount specified in the resource allocation request, wherein calculating the available amount comprises:

calculating a first amount by subtracting a total amount of the particular resource currently in use by the non-global partition from the first resource limit;

calculating a second amount by subtracting a total amount of the particular resource currently in use by the first group of processes from the second resource limit; and setting the available amount to the lower of the first amount and the second amount;

allocating the determined amount to the process of the first group of processes.

7. The machine-readable medium of claim 6, wherein a global administrator sets the first resource limit.

8. The machine-readable medium of claim 6, wherein a non-global administrator sets at least one selected from a group consisting of the second resource limit and the third resource limit.

9. The machine-readable medium of claim 6, wherein if the resource allocation request is greater than the available amount, then the determined amount is set to the available amount.

10. The machine-readable medium of claim 6, wherein if the resource allocation request is greater than the available amount, then the determined amount is set to zero.

11. A system for implementing at least a portion of an operating system, comprising:

a processor; and a memory, wherein the memory comprises computer readable code executable by the processor that, when executed by the processor, is configured to:

establish, within a global operating system environment provided by an operating system, a non-global partition, which serves to isolate processes running within the non-global partition from at least one other non-global partition within the global operating system environment, wherein each of the non-global partitions share an operating system kernel with the global operating system environment, and wherein each of the non-global partitions comprises a distinct file system;

associate a first resource limit with the non-global partition, wherein the first resource limit indicates a maximum amount of a particular resource that may be allocated to the non-global partition;

associate a second resource limit with a first group of processes within the non-global partition, wherein the second resource limit indicates a maximum amount of the particular resource that may be allocated to the first group of two or more processes; and associate a third resource limit with a second group of processes within the non-global partition, wherein the third resource limit indicates a maximum amount of the particular resource that may be allocated to the second group of processes;

receiving a resource allocation request for the particular resource from a process of the first group of processes;

determining an amount of the particular resource that may be allocated by calculating an available amount of the particular resource, wherein if the resource allocation request is less than or equal to the available amount, then the amount is set to the amount specified in the resource allocation request, wherein calculating the available amount comprises:

calculating a first amount by subtracting a total amount of the particular resource currently in use by the non-global partition from the first resource limit;

calculating a second amount by subtracting a total amount of the particular resource currently in use by the first group of processes from the second resource limit; and setting the available amount to the lower of the first amount and the second amount;

allocating the determined amount to the process of the first group of processes.

12. The system of claim 11, wherein a global administrator sets the first resource limit.

13. The system of claim 11, wherein a non-global administrator sets the second resource limit and the third resource limit.

14. The system of claim 11, wherein if the resource allocation request is greater than the available amount, then the determined amount is set to the available amount.

15. The system of claim 11, wherein if the resource allocation request is greater than the available amount, then the determined amount is set to zero.

* * * * *